United States Patent
Schultes et al.

(10) Patent No.: US 6,906,142 B2
(45) Date of Patent: *Jun. 14, 2005

(54) MOLDING MATERIALS EXHIBITING AN IMPROVED LOW-TEMPERATURE IMPACT RESISTANCE

(75) Inventors: Klaus Schultes, Wiesbaden (DE); Michael Wicker, Seeheim-Jugenheim (DE); Werner Hoess, Heusenstamm (DE); Klaus Albrecht, Mainz (DE); Hans-Juergen Kress, Bruehl (DE)

(73) Assignee: Roehm GmbH & Co. KG, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/415,100
(22) PCT Filed: Oct. 22, 2001
(86) PCT No.: PCT/EP01/12173
§ 371 (c)(1),
(2), (4) Date: Apr. 30, 2003
(87) PCT Pub. No.: WO02/36683
PCT Pub. Date: May 10, 2002

(65) Prior Publication Data
US 2004/0039083 A1 Feb. 26, 2004

(30) Foreign Application Priority Data
Oct. 31, 2000 (DE) .......................... 100 54 053

(51) Int. Cl.$^7$ .......................... C08L 33/04; C08L 33/18; C08L 33/20; C08L 35/02; C08L 43/00
(52) U.S. Cl. .......................... 525/209; 525/222; 525/232; 525/238; 525/241; 525/243
(58) Field of Search .......................... 525/209, 222, 525/232, 238, 241, 243

(56) References Cited

U.S. PATENT DOCUMENTS 5,726,245 A  * 3/1998 Numrich et al. ............... 525/85
6,355,712 B1   3/2002 Schultes et al.

FOREIGN PATENT DOCUMENTS

| EP | 0 326 038 | 8/1989 |
| EP | 0 584 363 | 3/1994 |
| EP | 0 591 804 | 4/1994 |
| EP | 0 599 067 | 6/1994 |
| JP | 11 100484 | 4/1999 |

OTHER PUBLICATIONS

U.S. Appl. No. 10/502,057, filed Jul. 30, 2004, Schultes et al.

* cited by examiner

Primary Examiner—Nathan M. Nutter
(74) Attorney, Agent, or Firm—Oblon, Spivak, McClelland, Maier & Neustadt, P.C.

(57) ABSTRACT

The invention relates to an impact-modified moulding composition which has particularly high impact resistance at low temperatures (−20° C., −40° C.). This low-temperature impact resistance is achieved by using a silicone elastomer.

11 Claims, No Drawings

MOLDING MATERIALS EXHIBITING AN IMPROVED LOW-TEMPERATURE IMPACT RESISTANCE

TECHNICAL FIELD OF THE INVENTION

The invention relates to impact-resistant polymethacrylate moulding compositions (PMMA moulding compositions) with improved low-temperature impact resistance.

PRIOR ART

For PMMA moulding compositions (MCs) the impact modifiers generally used are core-shell (C/S) or core-shell-shell (C/S1/S2) particles (particle size from 100 to 1000 nm), which are usually prepared by emulsion polymerization. In the case of C/S structure, the core is composed of an elastomeric phase, while in C/S1/S2 particles the elastomeric phase is generally the shell (S1) which has been grafted onto the core. Besides emulsion polymers, suspension polymers may also be used. Here, the elastomeric phase is in grafted form, with MMA for example, and is present in relatively finely divided form in the beads (matrix material, e.g. PMMA).

The elastomeric phase is mostly composed of crosslinked copolymer, which is in most cases prepared using butyl acrylate. However, an example of another elastomeric phase used is polybutadiene.

The literature describes impact modifiers which include silicone rubber.

In relation to the structure of the graft copolymers, a broad distinction may be drawn between C/S and C/S1/S2 particles. The C/S particles are grafted silicone particles, examples of graft monomers used being MMA, styrene and acrylonitrile. C/S particles in which the core is composed of a mixture of silicone rubber and acrylic rubber (no grafting) are a special case (for example EP 430 134). C/S1/S2 particles are described in DE 3 617 267, DE 3 720 475, DE 3 801 537, DE 3 822 667, DE 3 839 587, DE 4 040 986, DE 4 342 048 and EP 433 906, for example. The following structure is mostly involved here: C-silicone/S1-acrylic rubber or other silicone layer/S2-various copolymers (for binding to the matrix). In the case of the C/S1/S2 particles in DE 3 720 475, the core is composed of a vinyl rubber, S1 of silicone rubber and S2 of various copolymers.

The graft copolymers prepared are used as impact modifiers for certain plastics (often PC, SAN, polystyrene) or polymer blends.

EP 430 134: Here, a core composed of a silicone rubber and of an acrylic rubber (these intertwined rubbers being prepared by using acrylate derivatives to swell the silicone latex and then polymerizing them) is grafted with vinyl monomers. The material is also described for impact modification of moulding compositions, but here only polycarbonate (PC) and/or polyester moulding compositions are mentioned.

U.S. Pat. No. 4,690,986: Here, an impact-resistant moulding composition (ir) is claimed, prepared from a graft copolymer (via emulsion polymerization). The graft copolymer is a C/S product. The core is composed, inter alia, of a crosslinking agent (siloxane bonded to a methacrylate group via a number of $CH_2$ groups) and of tetrafunctional silane as crosslinking agent. The moulding composition (ir) per se is described, as is the associated preparation process.

JP 612 135 462: Here, a moulding composition (ir) is claimed, prepared from a graft copolymer (via emulsion polymerization). The graft copolymer is composed of siloxane grafted with vinyl monomers.

EP 308 198: Here, a moulding composition is claimed, composed of PMI and grafted polysiloxane. The grafted polysiloxane is prepared by grafting of monomers and of at least one "graft-crosslinking agent". It is clear from the subclaims that the graft-crosslinking agent is the crosslinking agent (siloxane bonded to a methacrylate group via a number of $CH_2$ groups) in U.S. Pat. No. 4,690,986. The subclaims also mention the tetrafunctional silane as crosslinking agent.

EP 332 188: Here, a graft copolymer similar to that in EP 430134 is used to modify an MC. In the example, particles are grafted with styrene and these are used to modify a polyether/polysulphone blend.

DE 4 342 048: Here, a graft copolymer in the form of C/S1/S2 particles is claimed. A silicone rubber functions as core, S1 is prepared mainly from acrylates (min. 70%), and there is a wide choice of monomers for S2 (e.g. 50–100% of methyl methacrylate). The subclaims also describe ir MCs based on the claimed graft polymer, and here again there is a very wide choice of polymer for the matrix.

DE 3839287: Here, a MC is claimed, composed of from 20–80% of conventional polymers and from 80–20% of graft copolymers. The graft copolymer is composed of C/S1/S2 particles, the core being composed of silicone rubber and S1 being composed of acrylate rubber. S2 is prepared by redox polymerization (emulsion) of a very wide variety of monomers. Only one ir-modified SAN moulding composition is listed as an example.

WO 99/41315: Here, a dispersion is claimed, comprising a mixture of particles composed of vinyl copolymers and particles composed of PMMA-sheathed silicone rubber. This dispersion can be used as an impact modifier, for example.

OBJECT AND ACHIEVEMENT OF OBJECT

Preparation of impact-resistant moulding compositions (ir MCs) based on PMMA is widely practised. The impact resistance of the moulding composition is increased by using what are known as impact modifiers. These modifiers are compounded into the appropriate standard PMMA moulding compositions.

Acceptable impact resistances extending to −10° C. in PMMA MCs are achieved with the aid of the conventional modifiers, which comprise butyl acrylate rubber as elastomeric phase. In order to achieve acceptable impact resistances at even lower temperatures, another rubber (with a lower glass transition temperature ($T_g$) than butyl acrylate rubber) has to be used as elastomeric phase. An example of an elastomeric phase used here is polybutadiene. These polybutadiene-based modifiers have a very disadvantageous effect on the weathering resistance of the moulding compositions in whose preparation they are used.

The object was then to find a modifier which achieves acceptable impact resistance of the PMMA moulding compositions or of the PMMA/SAN blends at relatively low temperatures (<−10° C.) and which, when comparison is made with PMMA moulding compositions or PMMA/SAN blends prepared using polybutadiene-based modifiers, gives the moulding composition or blend better weathering resistance. At the same time, however, the melt viscosity, die swell, heat distortion temperature and Vicat softening point of the appropriate moulding compositions cannot be permitted to suffer through the use of the new modifiers. A composition according to the patent claims achieves these objects and other objects not explicitly specified here.

The moulding compositions thus modified are to be used for producing useful products which have to remain impact-resistant even at lower temperatures (extending to −40° C.) These useful products are to be suitable for both indoor and outdoor applications. Examples of these applications are: mouldings for the automotive industry (e.g. mirror housings and spoilers), for the construction industry (e.g. coloured pipes and protective covers) and for the household industry (e.g. refrigerators).

EP 492 376 claims a graft copolymer (and also the process for preparing this graft copolymer), composed of C/S or C/S1/S2 particles. The core and the optional intermediate shell are more precisely defined and are composed of silicone rubber, and the outer shell is prepared by emulsion polymerization of a very wide variety of monomers (without further emulsifier). The particle size is restricted to 10–300 nm, and the polydispersity index is not more than 0.2. In the examples, the claimed graft copolymer is, inter alia, blended with PMMA and the NIS at 23° C. is measured.

The preparation of the product SLM 44 59 06 is described in EP 492 376, and the preparation of the product SLM 44 50 06 is described in EP 492 376. The difference between the products lies in their work-up. All of the products are obtainable from Wacker-Chemie GmbH.

The copolymer is composed of a core a) composed of an organosilicon polymer and of an organopolymer shell c) or two shells b) and c) where the inner shell b) is composed of an organosilicon polymer, characterized in that the copolymer is composed of a) from 0.05 to 95% by weight, based on the total weight of the copolymer, of a core polymer of the general formula $(R_2SiO_{2/2})_x \cdot (SiO_{4/2})_z$, where x=from 0 to 99.5 mol %, y=from 0.5 to 100 mol %, z=from 0 to 50 mol %, b) from 0 to 94.5% by weight, based on the total weight of the copolymer, of a polydialkylsiloxane shell of $(R_2SiO_{2/2})$ units, and c) from 5 to 95% by weight, based on the total weight of the copolymer, of a shell of an organopolymer of monoolefinically unsaturated monomers, where R are identical or different alkyl or alkenyl radicals having from 1 to 6 carbon atoms, aryl radicals or substituted hydrocarbon radicals, and the particles have a particle size of from 10 to 300 nm and a monomodal particle size distribution with a polydispersity index of not more than 0.2.

EP 492 376 describes the preparation of the silicone graft copolymers and describes their use for the impact-modification of polyvinyl chloride (PVC), PMMA, polystyrene (PS) and styrene-acrylonitrile copolymer (SAN).

In the case of PMMA mixtures, notched impact resistance was determined only at 23° C., and nothing at all is said concerning use or indeed any particular effects at lower temperatures.

EXAMPLES

Blending of Moulding Compositions

A standard PMMA-based moulding composition, PLEXIGLAS® 7 N (producer: Röhm GmbH) is blended with different amounts of various Wacker silicone modifiers, by means of an extruder. The compositions of each of the examples are documented in Appendix 1.

Silicone Modifier

A.) SLM 445906 Core-Shell Modifier, Wacker, Germany:

Precipitated emulsion polymer composed of silicone elastomer particles with PMMA shell. The material is substantially free from emulsifiers. Preparation described in EP 492 376. Particle size about 100 nm, distribution monomodal.

B.) SLM 445006 Core-Shell Modifier, Wacker, Germany:

Spray-dried emulsion polymer composed of silicone elastomer particles with PMMA shell. Preparation described in EP 492 376. Particle size about 100 nm, distribution monomodal.

Two impact-modified moulding compositions serve as comparison.

Table of blends

|  | Matrix | Modifier C |
|---|---|---|
| Blend A | Plexiglas 7N 80.3% by weight | 19.7% by weight |
| Blend B | Plexiglas 7N: 63.3% by weight | 36.7% by weight |

Comparative Examples

C.) Acrylic Rubber Modifier, Röhm Composition:

| Core: | Copolymer of methyl methacrylate (95.7% by weight), ethyl acrylate (4% by weight) and allyl methacrylate (0.3% by weight) |
|---|---|
| S1: | Copolymer of butyl acrylate (81.2% by weight), styrene (17.5% by weight) and allyl methacrylate (1.3% by weight) |
| S2: | Copolymer of methyl methacrylate (96% by weight) and ethyl acrylate (4% by weight) |

C/S1/S2 ratio by weight: 23/47/30

The preparation of the modifiers is based on the process disclosed in DE 33 00 526.

Testing of Moulding Compositions

Test specimens were produced from the blended moulding compositions. The following methods were used to test the moulding compositions and, respectively, the corresponding test specimens:

| Viscosity $\eta_s$ (220° C./ 5 MPa: | Determination of melt viscosity, Test standard: DIN 54811: (1984) |
|---|---|
| Die swell B: | Determination of die swell, Test standard: DIN 54811: (1984) |
| MVR (230° C./3.8 kg): | Determination of volume flow index, Test standard ISO 1133: (1997) |
| Vicat softening point (16 h/80° C.): | Determination of Vicat softening point Test standard ISO 306 (method B50): 1994) |
| HDT (16 h/80° C. A 1.8 MPa): | Determination of distortion temperature, Test standard: ISO 75 (Sept. 1993) |
| NIS (Izod 180/1eA): | Determination of Izod notched impact resistance, Test standard: ISO 180: (1993) |
| Modulus of elasticity | Determination of modulus of elasticity, Test standard: ISO 527-2 |
| Tensile strength | Determination of tensile strength, Test standard: ISO 527-2 |
| Yield stress | Determination of yield stress, Test standard: ISO 527-2 |

-continued

| Nom. tensile strain at break | Determination of nominal tensile strain at break, Test standard: ISO 527-2 |

The results of the tests are seen in Appendix 2.

The advantages of the moulding compositions blended with silicone modifier over the moulding compositions with conventional impact-modification (blends A and B) are clearly visible:

At comparable content of impact modifiers (Comparative Example 1, Example 3, Example 5), the notched impact resistance of each of the moulding compositions at 23° C. is at the same level. At −20° C. the notched impact resistance of the moulding compositions blended with silicone modifier is markedly higher (better), while melt viscosity, die swell, distortion temperature and Vicat softening point remain at the same level for all of the moulding compositions compared.

The relatively small addition (10.5% by weight) of silicone modifier to a moulding composition with conventional impact-modification (Example 1) can markedly raise notch impact strength, achieving the level of blend B (Comparative Example 2), which has markedly higher modifier content, at 23° C. At −20° C. the notched impact resistance of the moulding composition blended with silicone modifiers is markedly higher (better). It is also apparent that when comparison is made with blend B the Vicat softening point and distortion temperature of the moulding compositions blended with silicone modifier are higher (better), while melt viscosities and die swells are at a comparable level.

APPENDIX 1

Composition of each of the examples

| | Comparative Example 1 | Comparative Example 2 | Example 1 | Example 2 | Example 3 | Example 4 | Example 5 |
|---|---|---|---|---|---|---|---|
| PLEXIGLAS ® 7 N moulding composition | 80.3% | 63.3% | 71.4% | 88.8% | 77.6% | 88.5% | 78.6% |
| Blend A | (100%) | | | | | | |
| Blend B | | (100%) | | | | | |
| Modifier | | | | | | | |
| A.) | | | | 11.2% | 22.4% | | |
| B.) | | | 10.5% | | | 11.5% | 21.4% |
| C.) | 19.7% | 36.7% | 18.4% | | | | |

APPENDIX 2

Test results

| Property | Unit | Comparative Example 1 | Comparative Example 2 | Example 1 | Example 2 | Example 3 | Example 4 | Example 5 |
|---|---|---|---|---|---|---|---|---|
| Viscosity $\eta_s$ (220° C./5 MPa) | Pas | 1930 | 2780 | 2880 | 1680 | 2460 | 1640 | 2290 |
| Die swell B | % | 25 | 11 | 13.1 | 33.5 | 16.8 | 32.5 | 19.7 |
| MVR (230° C./3.8 kg) | cm³/10 min | 3.3 | 1.6 | 1.524 | 3.9 | 2.2 | 4.1 | 2.2 |
| Vicat softening point (16 h/80° C.) | ° C. | 100 | 95 | 98.1 | 102 | 100 | 101.8 | 99.8 |
| HDT (16 h/80° C. A 1.8 MPa) | ° C. | 93 | 88 | 94.4 | 96 | 95 | 95 | 95 |
| NIS (Izod 180/1eA) | | | | | | | | |
| 23° C. | kJ/m² | 4.3 | 6.0 | 6.47 | 2.3 | 4.53 | 2.1 | 4.713 |
| −10° C. | | | 3.1 | | | | | |
| −20° C. | kJ/m² | 1.69 | 2.3 | 3.25 | 1.93 | 3.93 | 1.98 | 3.91 |
| −40° C. | kJ/m² | | | 2.67 | 1.9 | 3.66 | 1.73 | 3.63 |
| Modulus of elasticity | Mpa | 2400 | 1800 | 2117 | 2795 | 2376 | 2818 | 2462 |
| Tensile strength | Mpa | | | 41.2 | 59.1 | 48.3 | 59.5 | 49.9 |
| Yield stress | Mpa | 62 | 45 | 40.3 | 59.1 | 48.2 | 59.4 | 49.5 |
| Nom. tensile strain at break | % | 27 | 54 | 45 | 10.3 | 9.1 | 10.7 | 15.8 |

What is claimed is:
1. An impact resistant PMMA molding composition, comprising:
 a) a matrix copolymer of from 75 to 100% by weight of methyl methacrylate from 0 to 15% by weight of acrylate and from 0 to 15% by weight of other copolymerizable compounds, and
 b) another matrix copolymer of from 70 to 92% by weight of styrene from 8 to 30% by weight of acrylonitrile from 0 to 22% by weight of other comonomers, and
 c) an impact modifier mixture of
 c1) silicone elastomer particles having a PMMA shell and
 c2) an impact modifier based on acrylate rubber, where (i) the contents of c1) are from 5 to 100% by weight and of c2) are from 0 to 95% by weight, based on the entirety of c1) and c2), (ii) the amount of c) in the composition ranges from 5 to 60% by weight, based on the entirety of components a) and b) and c), (iii) the content of a) ranges from 50 to 95% by weight, and the content of b) ranges from 0to 45% by weight, the contents of the components of the composition being 100% in total, and the molding composition having the following properties:

a Vicat softening point to ISO 306 (B50) of at least 950° C., a notched impact strength NIS (Izod 180/1 eA, 1.8 MPa) to ISO 180 of at least 3.0 kJ/m$^2$ at −20° C. and of at least 2.5 kJ/m$^2$ at −40° C., and a modulus of elasticity to ISO 527-2 of at least 2000 MPa.

2. The impact-resistant PMMA molding composition according to claim 1, wherein the matrix copolymer has a weight average molecular weight from 90,000 to 250,000 daltons.

3. The impact-resistant PMMA molding according to claim 1, wherein the impact-modifier c1) has a silicone content of up to 95% by weight.

4. The impact-resistant PMMA molding according to claim 1, wherein the PMMA shell of the impact modifier c1) is comprised of the polymer of from 30 to 100% by weight of methyl methacrylate and from 0 to 30% by weight of other copolymerizable compounds.

5. The impact-resistant PMMA molding according to claim 1, wherein the primary particle size of the impact modifier c1) is a diameter of from 10 to 300 nm and the distribution of the primary particle sizes is monomodal (polydispersity index not more than 0.2).

6. The impact-resistant PMMA molding according to claim 1, wherein the impact modifier c2) is composed either (i) of core-shell particles (core composed of acrylate rubber having a particle size ranging from 100 to 1000 nm), or (ii) of core-shell-shell (C/S1/S2) particles (S1 composed of acrylate rubber having a particle size ranging from 100 to 1000 rim), or (iii) of finely divided acrylate rubber in PMMA beads (particle size ranging from 100 to 500 μm).

7. A method of producing molded objects, comprising:

injection molding or extruding the impact resistant molding composition of claim 1 into a shaped object which, even at temperatures as low as −40° C. have a notched impact strength NIS (Izod 180/1 eA, 1.8 MPa) to ISO 180 of at least 2.5 kJ/m$^2$.

8. The method according to claim 7, wherein said shaped object functions for periods of time while exposed to temperatures below −10° C.

9. A method, comprising:

shaping the molding composition of claim 1 into a mirror housing or a spoiler of a vehicle that functions even exposed to temperatures below −10° C.

10. A method, comprising:

shaping the molding composition of claim 1 into a tube or a protective covering that functions even exposed to temperatures below −10° C.

11. A method, comprising:

shaping the molding composition of claim 1 into a refrigerator component that functions even exposed to temperatures below −10° C.

* * * * *